United States Patent
Reddy et al.

(10) Patent No.: US 11,521,131 B2
(45) Date of Patent: Dec. 6, 2022

(54) SYSTEMS AND METHODS FOR DEEP-LEARNING BASED SUPER-RESOLUTION USING MULTIPLE DEGRADATIONS ON-DEMAND LEARNING

(71) Applicant: Jumio Corporation, Palo Alto, CA (US)

(72) Inventors: Sai Narsi Reddy Donthi Reddy, Kansas City, MO (US); Qiqin Dai, San Mateo, CA (US)

(73) Assignee: Jumio Corporation, Palo Alto, CA (US)

(*) Notice: Subject to any disclaimer, the term of this patent is extended or adjusted under 35 U.S.C. 154(b) by 905 days.

(21) Appl. No.: 16/256,371

(22) Filed: Jan. 24, 2019

(65) Prior Publication Data
US 2020/0242515 A1     Jul. 30, 2020

(51) Int. Cl.
*G06N 20/00*     (2019.01)
*G06N 20/10*     (2019.01)
(Continued)

(52) U.S. Cl.
CPC .............. *G06N 20/10* (2019.01); *G06F 17/18* (2013.01); *G06N 7/00* (2013.01); *G06T 5/002* (2013.01); *G06T 5/003* (2013.01)

(58) Field of Classification Search
CPC .......... G06N 20/10; G06N 7/00; G06N 3/084; G06N 7/005; G06N 3/02;
(Continued)

(56) References Cited

U.S. PATENT DOCUMENTS

| 10,701,394 B1* | 6/2020 | Caballero | G06N 3/08 |
| 2010/0183217 A1* | 7/2010 | Seung | G06V 10/267 |
| | | | 382/156 |

(Continued)

FOREIGN PATENT DOCUMENTS

| JP | 2018097731 A * | 6/2018 | G06T 3/40 |
| WO | WO-2016132146 A1 * | 8/2016 | G06N 3/0454 |

OTHER PUBLICATIONS

Gao et al., "On-Demand Learning for Deep Image Restoration," IEEE International Conference on Computer Vision and Pattern Recognition, Oct. 2017, 1086-1095.

*Primary Examiner* — Jose L Couso
(74) *Attorney, Agent, or Firm* — Patent Law Works LLP

(57) ABSTRACT

A machine learning model can be trained using a first set of degraded images for each of a plurality of combinations and corresponding reference images, where a number of degraded images in the first set corresponding to a particular combination of the plurality of combinations is selected in accordance with a probability value associated with the particular combination. A validation process can be used to determine a loss value for each of the plurality of combinations of degradations. Updates to the probability values associated with the plurality of combinations can be calculated based on the loss values. The machine learning model can be updated using a second set of degraded images for each of the plurality of combinations, and the corresponding reference images, where a number of degraded images in the second set corresponding to the particular combination is selected based on the updated probability value.

20 Claims, 4 Drawing Sheets

(51) Int. Cl.
*G06T 5/00* (2006.01)
*G06F 17/18* (2006.01)
*G06N 7/00* (2006.01)

(58) Field of Classification Search
CPC .......... G06N 3/08–088; G06N 3/0454; G06N 20/00; G06F 17/18; G06T 5/002; G06T 5/003; G06T 2207/20084; G06T 3/4046; G06T 3/4053; G06T 2207/20081; G06T 5/001; G06T 5/50; G06T 7/40; G06T 2207/20182; G06T 2207/10016; G06K 9/00; G06K 9/6215; G06K 9/6262; G06V 10/40; G06V 10/54; G06V 10/70; G06V 10/761; G06V 10/766; G06V 10/776; G06V 10/778; G06V 30/10; G06V 30/18; G06V 30/194; G06V 30/1916; G06V 30/19167; G06V 30/302; G06V 30/19093; H04N 19/117; H04N 19/136; H04N 19/154; H04N 19/36
See application file for complete search history.

(56) References Cited

U.S. PATENT DOCUMENTS

| | | | |
|---|---|---|---|
| 2018/0075581 A1* | 3/2018 | Shi | G06T 3/4046 |
| 2018/0139458 A1* | 5/2018 | Wang | H04N 19/59 |
| 2018/0293711 A1* | 10/2018 | Vogels | G06K 9/6256 |
| 2019/0304069 A1* | 10/2019 | Vogels | G06N 3/08 |
| 2019/0306526 A1* | 10/2019 | Cho | G06N 20/00 |
| 2019/0378242 A1* | 12/2019 | Zhang | G06V 10/82 |
| 2020/0126191 A1* | 4/2020 | Munkberg | G06T 7/50 |

\* cited by examiner

SYSTEMS AND METHODS FOR DEEP-LEARNING BASED SUPER-RESOLUTION USING MULTIPLE DEGRADATIONS ON-DEMAND LEARNING

FIELD OF THE INVENTION

This disclosure generally relates to training a machine learning model to perform super-resolution techniques. In particular, this disclosure relates to training a machine learning model to perform super-resolution techniques using multiple degradations on-demand learning.

BACKGROUND

Machine learning models, such as those that use artificial neural networks, can be trained to perform super-resolution techniques, which generally refers to predicting a high-resolution image from a low-resolution version. These techniques typically involve using one or more image reconstruction processes. For example, neural networks can be trained to perform denoising and/or deblurring processes to predict a high-resolution image from a low-resolution version.

SUMMARY

In at least one aspect of the present disclosure a method is provided. The method includes obtaining a plurality of reference images and applying a plurality of combinations of degradations on the reference images to generate degraded images corresponding to each of the plurality of combinations. The method includes training a machine learning model using (i) a first set of degraded images for each of the plurality of combinations, and (ii) the corresponding reference images, wherein a number of degraded images in the first set corresponding to a particular combination of the plurality of combinations is selected in accordance with a probability value associated with the particular combination. The method includes determining, using a validation process for the machine-learning model, a loss value for each of the plurality of combinations of degradations. The method includes calculating, based on the loss values, updates to the probability values associated with the plurality of combinations. The method includes updating the machine learning model using (i) a second set of degraded images for each of the plurality of combinations, and (ii) the corresponding reference images, wherein a number of degraded images in the second set corresponding to the particular combination is selected based on the updated probability value associated with the particular combination.

The plurality of combination of degradations can include at least one of: noise, blur, or resolution downscaling. The probability values can be initialized as equal to each other. The validation process can include obtaining a second plurality of reference images and applying the plurality of combinations of degradations on multiple subsets of the second plurality of reference images to generate validation images corresponding to each of the plurality of combinations. The validation process can include generating enhanced images from the validation images using the updated machine learning model. Determining the loss value can include at least one of: calculating a pixel loss value, a high-frequency loss value, a total loss value, or a match error. Determining the loss value for a particular combination can include determining one or more metrics of similarity between (i) validation images for the particular combination and (ii) the corresponding enhanced images. Calculating updates to the probability values can include determining, that the loss value for a first particular combination is higher than the loss value for a second particular combination and responsive to determining that the loss value for the first particular combination is higher than the loss value for the second particular combination, assigning a first probability value to the first particular combination, the first probability value being higher than a second probability value assigned to the second particular combination.

In at least one other aspect of the present disclosure, a system is provided. The system includes a computer-readable memory comprising computer-executable instructions; and at least one processor executing executable logic including at least one machine learning module trained to resolve an image. When the at least one processor is executing the computer-executable instructions, the at least one processor carries out operations to: obtain a plurality of reference images; apply a plurality of combinations of degradations on the reference images to generate degraded images corresponding to each of the plurality of combinations train a machine learning model using (i) a first set of degraded images for each of the plurality of combinations, and (ii) the corresponding reference images, wherein a number of degraded images in the first set corresponding to a particular combination of the plurality of combinations is selected in accordance with a probability value associated with the particular combination; determine, using a validation process for the machine-learning model, a loss value for each of the plurality of combinations of degradations; calculate, based on the loss values, updates to the probability values associated with the plurality of combinations; and update the machine learning model using (i) a second set of degraded images for each of the plurality of combinations, and (ii) the corresponding reference images, wherein a number of degraded images in the second set corresponding to the particular combination is selected based on the updated probability value associated with the particular combination.

In another aspect, the present disclosure describes one or more machine-readable storage devices encoded with instructions configured to cause one or more processing devices to execute various operations. The operations include obtaining a plurality of reference images, and applying a plurality of combinations of degradations on the reference images to generate degraded images corresponding to each of the plurality of combinations. The operations also include training a machine learning model using (i) a first set of degraded images for each of the plurality of combinations, and (ii) the corresponding reference images, wherein a number of degraded images in the first set corresponding to a particular combination of the plurality of combinations is selected in accordance with a probability value associated with the particular combination. The operations further include determining, using a validation process for the machine-learning model, a loss value for each of the plurality of combinations of degradations, calculating, based on the loss values, updates to the probability values associated with the plurality of combinations, and updating the machine learning model using (i) a second set of degraded images for each of the plurality of combinations, and (ii) the corresponding reference images. A number of degraded images in the second set corresponding to the particular combination is selected based on the updated probability value associated with the particular combination.

Each of the above aspects can include one or more of the following features. The plurality of combination of degradations can include at least one of: noise, blur, or resolution downscaling. The probability values can be initialized as equal to each other. The validation process can include obtaining a second plurality of reference images and applying the plurality of combinations of degradations on multiple subsets of the second plurality of reference images to generate validation images corresponding to each of the plurality of combinations. The validation process can include generating enhanced images from the validation images using the updated machine learning model. Determining the loss value can include at least one of: calculating a pixel loss value, a high-frequency loss value, a total loss value, or a match error. Determining the loss value for a particular combination can include determining one or more metrics of similarity between (i) validation images for the particular combination and (ii) the corresponding enhanced images. Calculating updates to the probability values can include determining, that the loss value for a first particular combination is higher than the loss value for a second particular combination and responsive to determining that the loss value for the first particular combination is higher than the loss value for the second particular combination, assigning a first probability value to the first particular combination, the first probability value being higher than a second probability value assigned to the second particular combination.

In some implementations, the technology described herein can provide one or more of the following advantages. Training deep learning models to remove multiple degradations can be a highly complex problem. This disclosure provides systems and methods for training deep learning models to remove multiple degradations using sets of degraded images that exhibit particular degradation type and level combinations. First, the machine learning model can be trained to enhance degraded images by using sets of degraded images that exhibit one or more degradation type and level combinations. Then, the machine learning model can use a self-update mechanism associated with a validation process to update the number of degraded images corresponding to each particular degradation combination that are used in a subsequent training session. The self-update mechanism can use error rates calculated for each particular degradation combination to decide the number of degraded images for each degradation combination to use as training samples in the subsequent training session. This approach can lead to a deep learning model capable of producing higher quality images (as compared to traditional models) by optimizing the model to better handle higher degradation levels for each degradation type.

DETAILED DESCRIPTION

General Overview

Figure 1:
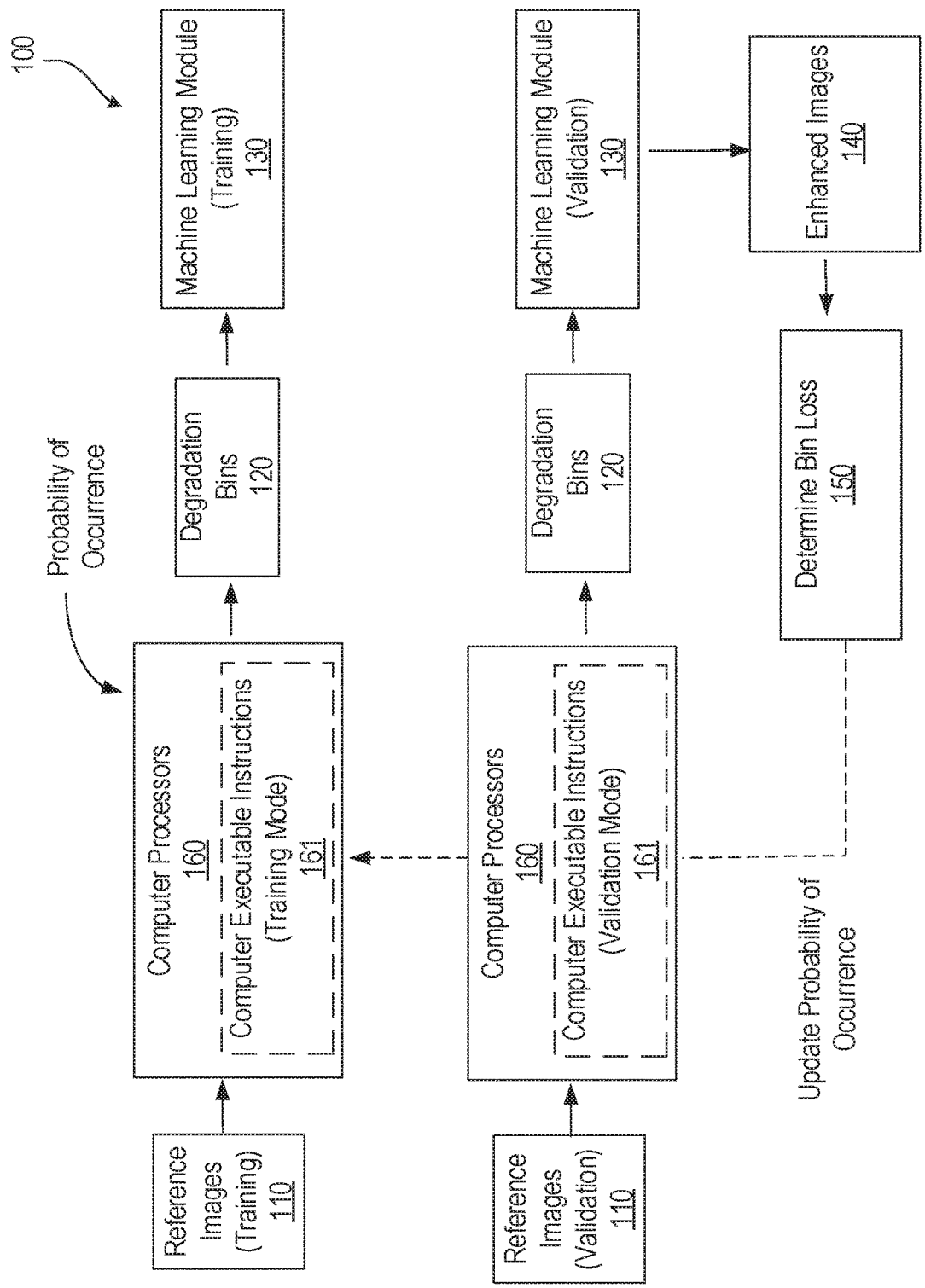
FIG. 1 shows a block diagram of an example system for implementing machine-learning based super resolution in accordance with technology described herein.

Machine learning models, such as those that use artificial neural networks, can be trained to perform super-resolution techniques, which generally refer to predicting a high-resolution image from a low-resolution version. These techniques typically involve using one or more image reconstruction processes. For example, neural networks can be trained to perform denoising and/or deblurring processes to predict a high-resolution image from a low-resolution version.

Training machine learning models to remove multiple degradations can be a highly complex problem. Even if a machine learning model is being trained to remove only two types of degradations such as noise and blur, each degradation type can have multiple levels and/or variants. For example, the noise can be of different levels (e.g., 10 dB noise, 20 dB noise etc.), and for each level of noise, there can be multiple levels of blur. The number of possible combinations of degradations grow exponentially as the levels/types of degradations increase. Training a machine learning model using a brute force approach that uses a large training set with substantially equal number of images from all combinations can be computationally expensive and/or time consuming. Further, training deep learning models using a similar amount of training data for all types and levels of degradations (e.g., the same number of training samples exhibit noise at 10 dB and noise at 20 dB) may not be adequately effective for image enhancement, particularly at higher degradation levels. Thus, it may be desirable to provide means for training deep learning models such that the models are optimized for performing image enhancement across several combinations of degradation type and levels.

Among other things, the present disclosure provides techniques for training a machine learning model to perform super-resolution on images using on-demand learning. The techniques provide a self-updating mechanism that is used to adaptively decide how many training samples to use for particular combinations of degradations, which in turn may improve image enhancement performance. First, degradation bins are generated where each degradation bin represents a particular degradation type and level combination. For example, assume a user wants to train an input model to enhance two degradation types (e.g., white noise and Gaussian blur) across two levels of degradations for each type (e.g., low and high). In this scenario, four degradation bins are generated, each having a number of degraded images for each of the four possible combinations. A training set of degraded images can be generated such that each degradation bin has an equal number of degraded images for training the machine learning model (e.g., the probability of occurrence for each bin/degradation combination is equal). These degraded images can be used to train the machine learning model to enhance each type and level of degradation. Then, a validation set of degraded images (e.g., validation images) are generated for each degradation bin/degradation combination. The trained machine learning model is applied to these degraded images for image enhancement. After the degraded images are enhanced, the enhanced images are compared with corresponding ground truth images, and based on this comparison, a loss value is obtained for each degradation bin (e.g., each particular degradation combination). The loss values are then used to update the number of degraded image samples used for each degradation bin in a subsequent training session (e.g., updating the probability of occurrence for each particular degradation combination). Thus, in the subsequent training sessions, more degraded image samples are generated for a particular degradation combination that was associated with higher loss during the validation session than the other particular degradation combinations associated with lower losses. The process may be repeated until the machine learning model can produce acceptable (e.g., as defined by a user) enhanced images across all degradation type and level combinations trained.

Deep-Learning Based Super Resolution Using On-Demand Multiple Degradation Learning FIG. 1 is an illustration showing an architecture 100 for performing deep-learning based super resolution using on-demand multiple degradation learning. The architecture 100 includes one or more computer processors 160 (also referred to herein as processing devices) and a machine learning module 130. In some implementations, the machine learning module 130 can be implemented using the computer processors 160, or one or more additional processing devices.

Reference images 110 are captured by one or more sensing devices. For example, in some implementations, the sensing device is a digital camera that uses a charged-coupled device (CCD) and/or complementary metal oxide semiconductor (CMOS) to convert photons to electrons for digital processing. The sensor can also be a light-emitting diode (LED) scanner, a laser scanner, an imaging scanner, and so forth. The reference images 110 can take the form of several image data formats, such as RAW, JPEG, PNG, and so forth. In some implementations, at least some of the reference images 110 are ocular images (e.g., still images of ocular structures such as the external eye, anterior segment, retina, etc.). In some implementations, the reference images 110 include high-frequency texture information and low-frequency texture information. High-frequency texture information refers to portions of an image that have sharp/contrast edges that show fine details of the image. Low-frequency texture information refers to portions of an image that have smooth gradients that generally provide information about an image's general colors and tones.

The computer processors 160 can include one or more processing devices such as microprocessors, microcontrollers or digital signal processors (DSPs). In some implementations, the computer processors 160 include a general purpose processor. In some implementations, the computer processors 160 include a central processing unit (CPU). In some implementations, the computer processors 160 include at least one application specific integrated circuit (ASIC). The computer processors 160 can also include general purpose programmable microprocessors, special-purpose programmable microprocessors, digital signal processors (DSPs), programmable logic arrays (PLAs), field programmable gate arrays (FPGA), special purpose electronic circuits, etc., or a combination thereof.

In some implementations, the computer processors 160 include a computer-readable medium (or computer-readable memory), The computer-readable medium can include any data storage technology type which is suitable to the local technical environment, including but not limited to semiconductor based memory devices, magnetic memory devices and systems, optical memory devices and systems, fixed memory, removable memory, disc memory, flash memory, dynamic random-access memory (DRAM), static random-access memory (SRAM), electronically erasable programmable read-only memory (EEPROM) and the like. In some implementations, the computer-readable medium includes code-segment having executable instructions. The computer processors 160 are configured to execute program code means such as the computer-executable instructions 161. The computer-executable instructions 161 can have instructions for operating in a training mode and/or instructions for operating in a validation mode.

While executing the computer-executable instructions 161 (e.g., for training mode and/or validation mode), The computer processors 160 are configured to receive a plurality of reference images 110 and generate, based on the reference images 110, a plurality of degradation bins 120 by applying one or more degradation type and level combinations to the reference images 110. For example, in some implementations the computer processors 160 apply, to the reference images 110, four possible combinations of degradation types and levels (e.g., additive white Gaussian noise at low level, additive white Gaussian noise at high level, Gaussian blur at low level, and Gaussian blur at high level). Thus, each generated degradation bin 120 can represent a particular degradation type and level combination, wherein each degradation bin 120 includes a number of degraded images having the particular degradation type and level combination associated with the degradation bin 120. In some implementations, the number of degraded images in each degradation bin 120 is based on a probability of occurrence for each particular degradation combination. Details on choosing the probability of occurrence for each particular degradation combinations are discussed later.

Examples of degradation effects that can be applied by the computer processors 160 to the reference images include noise, blur, and/or resolution downscaling to the reference images 110. Blur refers to the manipulation of an image such that the sharp, edge-like features are reduced, and transitions from one color to another appear smooth. Resolution downscaling refers to the reduction of pixel resolution in an image. Noise refers to the random variation of brightness and color information in images. The noise applied to degrade an image can include, for example, additive white Gaussian noise, salt and pepper, and so forth. The degradation effects can be accomplished using one or more processes associated with each degradation effect. As discussed previously, the computer processors 160 can apply different levels of each degradation type. For example, the computer processors 160 can apply noise at 10 dB and noise at 20 dB. Hereinafter, the levels of degradation may be described using relative terms, such as high and low, wherein a low level describes a magnitude of the degradation effect (e.g., 10 dB of noise) that is lower than a high level of the degradation effect (e.g., 20 dB of noise).

In some implementations, the machine learning module 130 is integrated with the computer processors 160. However, the machine learning module 130 can be separate from the computer processors 160. The machine learning module 130 can perform a variety of machine learning processes, such as deep learning techniques (e.g., convolutional, radial basis function, recurrent, and/or modular neural network processing techniques) and/or Bayesian learning techniques. The machine learning module 130 applies machine learning techniques to train a machine learning model that, when applied to input data, generates indications of whether the input data items have associated property or properties, such as probabilities that the input data items have a particular Boolean property, or an estimated value of a scalar property.

The machine learning module 130 is configured to operate in a training mode. In some implementations, the machine learning module 130 is trained to produce enhanced images 140 of the degraded images by removing the degradation combinations applied to the reference images 110. As part of the training of the machine learning module 130, the computer processors 160 forms a training set of input data (e.g., degraded images and associated reference images) by identifying a positive training set of input data items that have been determined to have the property in question, and, in some embodiments, forms a negative training set of input data items that lack the property in question. The machine learning module 130 extracts feature values from the input data of the training set, the features being variables deemed potentially relevant to whether or not the input data items have the associated property or properties. Specifically, the feature values extracted by the machine learning module 130 can include pixel values, color, and/or texture. An ordered list of the features for the input data is herein referred to as the feature vector for the input data. In one embodiment, the machine learning module 130 applies dimensionality reduction (e.g., via linear discriminant analysis (LDA), principle component analysis (PCA), or the like) to reduce the amount of data in the feature vectors for the input data to a smaller, more representative set of data.

The machine learning module 130 uses supervised machine learning to train a machine learning model, with the feature vectors of the positive training set and the negative training set serving as the inputs. Different machine learning techniques—such as linear support vector machine (linear SVM), boosting for other processes (e.g., AdaBoost), neural networks, logistic regression, naive Bayes, memory-based learning, random forests, bagged trees, decision trees, boosted trees, or boosted stumps—may be used in different embodiments. The machine learning model, when applied to the feature vector extracted from the input data item, outputs an indication of whether the input data item has the property in question, such as a Boolean yes/no estimate, or a scalar value representing a probability.

In some embodiments, a validation set is formed of additional input data, other than those in the training sets, which have already been determined to have or to lack the property in question. The machine learning module 130 applies the trained machine learning model to the data of the validation set to quantify the accuracy of the machine learning model. Common metrics applied in accuracy measurement include: Precision=TP/(TP+FP) and Recall=TP/(TP+FN), where precision is how many the machine learning model correctly predicted (TP or true positives) out of the total it predicted (TP+FP or false positives), and recall is how many the machine learning model correctly predicted (TP) out of the total number of input data items that did have the property in question (TP+FN or false negatives). The F score (F-score=2*PR/(P+R)) unifies precision and recall into a single measure. In one embodiment, the machine learning module 130 iteratively re-trains the machine learning model until the occurrence of a stopping condition, such as the accuracy measurement indication that the model is sufficiently accurate, or a number of training rounds having taken place.

The machine learning module 130 is also configured to operate in a validation mode. In validation mode, the machine learning module 130 is configured to receive degraded images (e.g., validation images) from the degradation bins 120 and, for each degraded image 120 (validation image 120), generate an enhanced image 140 by using one or more mapping functions. The one or more mapping functions may in turn be learned/generated by the machine learning module 130 during a previous iteration of the underlying training process using the reference images 110 and the corresponding degraded images as the training data (e.g., the training process described previously). In some implementations, the computer processors 160 and/or the machine learning module 130 are configured to calculate a bin loss value 150 for each degradation bin 120. This can include calculating a pixel loss value, a high-frequency loss (HFL) value, and/or a match value for the enhanced images 140 by comparing each enhanced image 140 to a corresponding reference image 110. The computer processors 160 are configured to use the bin loss values 150 to determine the number of degraded images for each degradation bin 120 (e.g., the probability of occurrence for each particular degradation combination being trained) while training the machine learning module 130 in subsequent training sessions. For example, in some implementations, the computer processors 160 increase the probability of occurrence for a particular degradation combination relative to other particular degradation combinations when the loss associated with the particular degradation combination is determined to be higher than the other degradation combinations. Thus, in subsequent training sessions, the number of degraded images in each degradation bin used to train the machine learning module 130 can depend on the loss (e.g., error) calculated for each degradation bin during the previous validation session.

In some implementations, calculating a pixel loss value includes comparing each reference image 110 to a corresponding enhanced image 140 generated by the machine learning module 130. In some implementations, the pixel values of several locations of each reference image 110 is compared with the pixel values of several locations of a corresponding enhanced image 140. The determined pixel loss value can represent the difference between the pixel values of the several locations of the reference images 110 and the pixel values of the associated locations of the corresponding enhanced images 140. For example, assume that a first reference image 110 is processed to generate a corresponding first degraded image, which is then processed to generate corresponding first enhanced image 140. Although the machine learning module 130 attempts to restore the first degraded image to the original first reference image 110, the resulting first enhanced image 140 may not exactly match the original first reference image. The pixel values at several locations of the first enhanced image 140 are compared with the pixel values of corresponding locations in the first reference image 110, and a pixel loss value is determined based on the differences between the pixel values of the first enhanced image 140 and the pixel values of the first reference image 110. In some implementations, the pixel loss value can be determined by the following:

$$\text{Loss}_{Pixel} = \frac{1}{N}\sum_{i=0}^{n} \text{abs}(T_i - E_i) \tag{1}$$

where T represents the pixel values of the reference images 110 and E represents the pixel values of the enhanced images 140.

Determining a HFL loss value can include comparing high-frequency information of the enhanced images 140 with high-frequency information of corresponding reference images 110. For example, in some implementations, the computer processors 160 (or the machine learning module 130) generate a blurred image for each reference image 110 and each enhanced image 140 by applying a Gaussian blur algorithm, having a standard deviation ($\sigma$), to the images. In some implementations, the blurred images only retain low-frequency information. In some implementations, other forms of degradations can also be used for generating images that retain low-frequency information.

For each reference image 110, the pixel values of the blurred image is subtracted from the corresponding pixel values of the original reference image to generate a corresponding high frequency image. Such pixel-wise difference is also calculated for each of the enhanced images 140. For example, for each enhanced image 140, the pixel values of the corresponding blurred image is subtracted from the original enhanced image 140. The subtraction of the blurred images from the original images is defined as follows:

$$HF_I = I - G_\sigma(I) \quad (2)$$

where $HF_I$ refers to a high-frequency image, I refers to the original image and $G_\sigma(I)$ refers to the low-frequency image. Thus, for every reference image 110, and for every enhanced image 140, a corresponding high-frequency image can be generated. For each enhanced image 140, the resulting high-frequency image is compared with the resulting high-frequency image of a corresponding reference image 110, and the differences (e.g., in terms of pixel values) are calculated to determine the HFL loss value. In some implementations, the HFL loss value is defined as the average (across the N training images) of absolute pixel-wise differences between the high frequency images corresponding to the reference images and the high frequency images corresponding to the enhanced images 140. This can be represented as:

$$\text{Loss}_{HFL} = \frac{1}{N} \sum_{i=0}^{n} \text{abs}(HF_{T_i} - HF_{E_i}) \quad (3)$$

where $HF_T$ is the high-frequency image of the reference image 110 and $HF_E$ is the high-frequency image of the enhanced image 140.

In some implementations, the computer processors 160 and/or the machine learning module 130 are configured to determine a total loss value. In some implementations, the total loss value is based on the HFL loss value. Alternatively or in addition to the HFL loss value, the total loss value is based on the pixel loss value. In some implementations, the total loss value is defined as:

$$\text{Loss}_{total} = \text{Loss}_{Pixel} + \alpha \text{Loss}_{HFL} \quad (4)$$

In some implementations, α is equal to 1.0. However, α can be selected as any number based on tested and/or perceived biases.

In some implementations, the computer processors 160 and/or the machine learning module 130 compare the total loss value with a threshold condition. For example, if the total loss value represents an error value between the enhanced images 140 and the reference images, the threshold condition can be a maximum error value. In some implementations, if the total loss value is above the maximum error value (e.g., or other threshold condition), the computer processors 160 and/or the machine learning module 130 determines that the threshold condition is satisfied. The threshold conditions can be chosen based on accuracy and computing efficiency considerations.

In some implementations, the total loss value is back-propagated through the machine learning module, where the machine learning module updates its one or more mapping functions by adjusting one or more weights and/or variables in order to minimize the total loss value. Thus, the calculated total loss value can represent the error between the generated enhanced images 140 and the reference images 110, and the machine learning module 130 can use this calculated error to adjust its one or more mapping functions such that it can learn to more accurately restore the degraded images in each degradation bin 120 to the reference images 110. In some implementations, the total loss value is back-propagated through the machine learning module 130 only if the total loss value satisfies the threshold condition.

Figure 2:
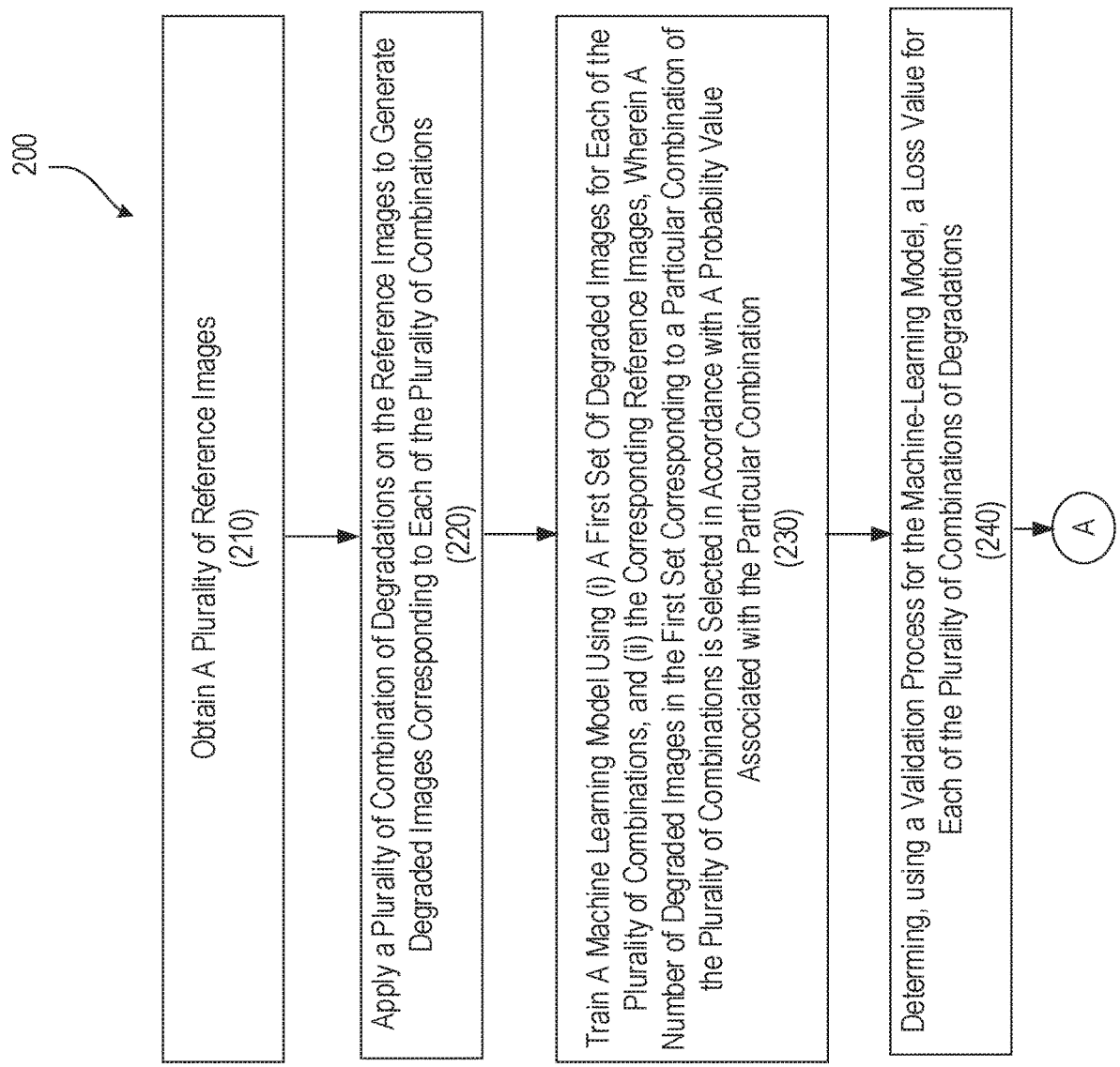
FIG. 2 is a flowchart depicting a process for training a machine-learning system that accounts for high frequency loss in generating super-resolution images.
Figure 2:
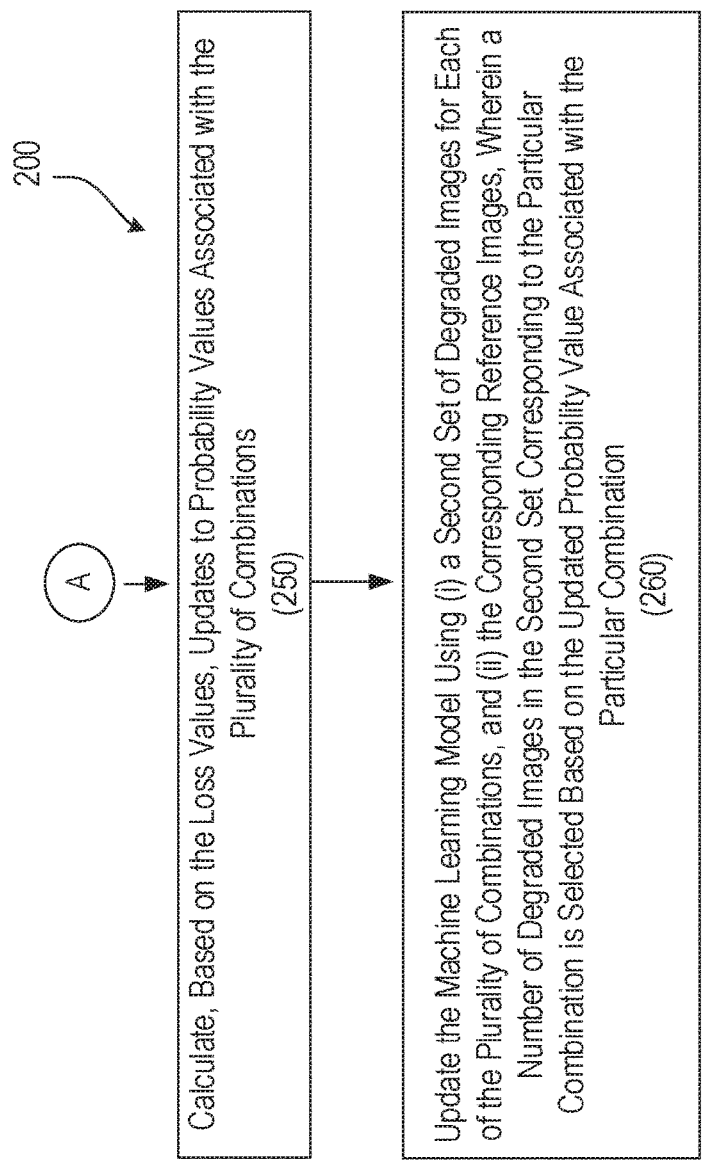

FIG. 2 is a flowchart depicting a process 200 for performing deep-learning based super resolution using on-demand multiple degradation learning. In some implementations, the process 200 can be executed, at least in part in a portion of the architecture 100 discussed previously with reference to FIG. 1. For example, portions of the process 200 can be executed by the machine learning module 130 and/or the one or more computer processors 160 described previously.

Operations of the process 200 include obtaining a plurality of reference images (block 210). The reference images can be a portion of training data used to train the machine-learning module 130. For example, the reference images can include high quality, high-resolution images that are usable by an underlying biometric authentication system for identification/verification of individuals. In some implementations, at least a portion of the reference images includes one or more ocular features usable for eye-print identification/verification.

Operations of the process 200 also include applying a plurality of combinations of degradations on the reference images to generate degraded images corresponding to each of the plurality of combinations (block 220). One or more degradation type and level combinations are applied to the reference images. In some implementations, degradation bins are generated for each particular degradation combination (e.g., type and level of degradation) For example, four possible combinations of degradation types and levels can be applied to the reference images (e.g., additive white Gaussian noise at low level, additive white Gaussian noise at high level, Gaussian blur at low level, and Gaussian blur at high level). Thus, each generated degradation bin can represent a particular degradation type and level combination, wherein each degradation bin includes a number of degraded images having the particular degradation type and level associated with the degradation bin.

Operations of the process 200 include training a machine learning model using (i) a first set of degraded images for each of the plurality of combinations, and (ii) the corresponding reference images, where the number of degraded images in the first set corresponding to a particular combination of the plurality of combinations is selected in accordance with a probability value associated with the particular combination (block 230). In some implementations, the probability values associated with each and every particular degradation combination are equal to each other during an initial training session. For example, for the four degradation combinations discussed previously, each particular degradation combination can have a 25% probability of occurrence. Thus, in some instances, each generated degradation bin will have an equal number of degraded images to be used as training samples. For each particular degradation combination, the machine learning model compares the degraded images to corresponding reference images to generate a mapping function to be used to generate enhanced images. In some implementations, the machine learning model uses one or more of the machine learning techniques discussed previously to generate the mapping functions during a particular training session.

Operations of the process 200 also include determining, using a validation process for the machine learning model, a loss value for each of the plurality of combinations of degradations (block 240). In some implementations, a second set of degraded images (e.g., set of validation images) is generated such that each degradation bin (e.g., each particular degradation type/level combination) includes an equal number of degraded images. The machine learning model is applied to the degraded images, and for each degradation bin (each particular degradation type/level combination), the machine learning model generates corresponding enhanced images using the mapping functions generated during the training session. For each degradation bin, the enhanced images are compared to corresponding reference images, and based on the comparison, loss values are calculated for each degradation bin. Loss values can include pixel loss values, HFL loss values, total loss values, and/or match error values as discussed previously with reference to FIG. 1.

Operations of the process 200 also include calculating, based on the loss values, updates to probability values associated with the plurality of combinations (block 250). In some implementations, using the loss generated for each degradation bin ($L_{bin-i}$), the probability of occurrence for each degradation bin ($P_{bin}$) is determined according to the following:

$$P_{bin-i} = \frac{L_{bin-i}}{\sum_{i=0}^{n} L_{bin-i}}. \qquad (5)$$

Thus, for a subsequent training session, the number of degraded images for each degradation bin is based on the loss associated with each degradation bin during the validation session.

Operations of the process 200 includes updating the machine learning model using (i) a second set of degraded images for each of the plurality of combinations, and (ii) the corresponding reference images, where a number of degraded images in the second set corresponding to the particular combination is selected based on the updated probability value associated with the particular combination. In some implementations, after the validation process of block 240, a second (or subsequent) set of training reference images is obtained. The second set of training reference images may be substantially similar to or substantially different from the first set of training reference images. Based on the updated probability of occurrences, a second set of degraded images are generated from the set of training reference images for each degradation bin. Thus, the number of degraded images generated for each degradation bin is correlated with the loss value calculated for each degradation bin during the previous validation session. In some implementations, if a degradation bin has a higher loss value then other degradations bins, the degradation bin will include a higher number of degraded images for the second training session than the other degradation bins with lower associated loss values.

In some implementations, the operations of process 200 can be repeated until the machine learning model is determined to operate at an acceptable performance level. An acceptable performance level can be based on, for example, the loss values associated with each degradation bin. Acceptable performance can be defined by a user and/or manufacturer and be based on efficiency and utility considerations.

Figure 3:
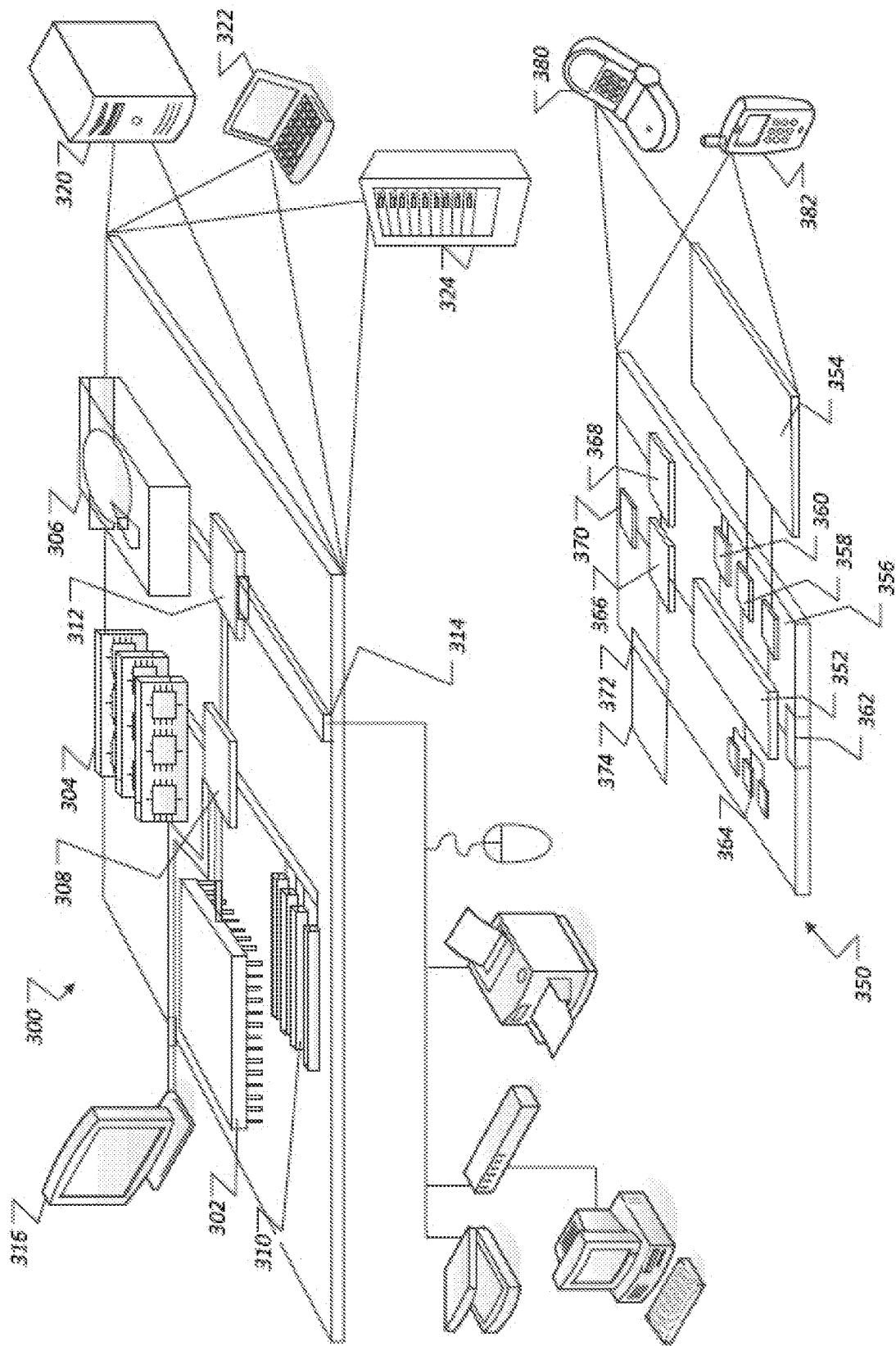
FIG. 3 are block diagrams of example computing devices that may be used in implementing a system in accordance with technology described herein.

FIG. 3 shows an example of a computing device 300 and a mobile device 350, which may be used with the techniques described here. For example, referring to FIG. 1, the device including the one or more computer processors 160 can be embodied as one or more of the computing device 300 or the mobile device 350, either in part or in its entirety. The machine learning module 130 can also include at least a portion of the computing device 300 or a mobile device 350. Computing device 300 is intended to represent various forms of digital computers, such as laptops, desktops, workstations, personal digital assistants, servers, blade servers, mainframes, and other appropriate computers. The mobile device 350 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, memory on processor 302, or a propagated signal.

The high speed controller 308 manages bandwidth-intensive operations for the computing device 300, while the low speed controller 312 manages lower bandwidth-intensive operations. Such allocation of functions is an example only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 306 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 368, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can execute instructions within the computing device 350, including instructions stored in the memory 364. The processor may be implemented as a chipset of chips that include separate and multiple analog and digital processors. The processor may provide, for example, for coordination of the other components of the device 350, such as control of user interfaces, applications run by device 350, and wireless communication by device 350.

Processor 352 may communicate with a user through control interface 358 and display interface 356 coupled to a display 354. The display 354 may be, for example, a TFT LCD (Thin-Film-Transistor Liquid Crystal Display) or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provide in communication with processor 352, so as to enable near area communication of device 350 with other devices. External interface 362 may provide, for example, for wired communication in some implementations, or for wireless communication in other implementations, and multiple interfaces may also be used.

The memory 364 stores information within the computing device 350. The memory 364 can be implemented as one or more of a computer-readable medium or media, a volatile memory unit or units, or a non-volatile memory unit or units. Expansion memory 374 may also be provided and connected to device 350 through expansion interface 372, which may include, for example, a SIMM (Single In Line Memory Module) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provide as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, memory on processor 352, or a propagated signal that may be received, for example, over transceiver 368 or external interface 362.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation- and location-related wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, and so forth) and may also include sound generated by applications operating on device 350.

The computing device 350 may be implemented in a number of different forms, as shown in the figure. For example, it may be implemented as a cellular telephone 380. It may also be implemented as part of a smartphone 382, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A method comprising:
   obtaining a plurality of reference images;
   applying a plurality of combinations of degradations on the reference images to generate degraded images corresponding to each of the plurality of combinations;
   training a machine learning model using (i) a first set of degraded images for each of the plurality of combinations, and (ii) the corresponding reference images, wherein a number of degraded images in the first set corresponding to a particular combination of the plurality of combinations is selected in accordance with a probability value associated with the particular combination;
   determining, using a validation process for the machine learning model, a loss value for each of the plurality of combinations of degradations;
   calculating, based on the loss values, updates to the probability values associated with the plurality of combinations, to obtain updated probability values; and
   updating the machine learning model using (i) a second set of degraded images for each of the plurality of combinations, and (ii) the corresponding reference images, wherein a number of degraded images in the second set corresponding to the particular combination is selected based on the updated probability value associated with the particular combination.

2. The method of claim 1, wherein the plurality of combinations of degradations comprise at least one of: noise, blur, or resolution downscaling.

3. The method of claim 1, wherein the probability values are initialized as equal to each other.

4. The method of claim 1, wherein the validation process comprises:
   obtaining a second plurality of reference images; and
   applying the plurality of combinations of degradations on multiple subsets of the second plurality of reference images to generate validation images corresponding to each of the plurality of combinations.

5. The method of claim 4, wherein the validation process further comprises generating enhanced images from the validation images using the updated machine learning model.

6. The method of claim 1, wherein determining the loss value comprises at least one of: calculating a pixel loss value, a high-frequency loss value, a total loss value, or a match error.

7. The method of claim 5, wherein determining the loss value for a particular combination comprises determining one or more metrics of similarity between (i) validation images for the particular combination and (ii) the enhanced images.

8. The method of claim 7, wherein calculating updates to the probability values comprises:
   determining, that the loss value for a first particular combination is higher than the loss value for a second particular combination; and
   responsive to determining that the loss value for the first particular combination is higher than the loss value for the second particular combination, assigning a first probability value to the first particular combination, the first probability value being higher than a second probability value assigned to the second particular combination.

9. A system, comprising:
   a computer-readable memory comprising computer-executable instructions; and
   at least one processor executing the computer executable instructions to provide a machine learning module, wherein training of the machine learning module comprises:
   obtaining a plurality of reference images;
   applying a plurality of combinations of degradations on the reference images to generate degraded images corresponding to each of the plurality of combinations;
   training a machine learning model using (i) a first set of degraded images for each of the plurality of combinations, and (ii) the corresponding reference images, wherein a number of degraded images in the first set corresponding to a particular combination of the plurality of combinations is selected in accordance with a probability value associated with the particular combination;
   determining, using a validation process for the machine learning model, a loss value for each of the plurality of combinations of degradations;
   calculating, based on the loss values, updates to the probability values associated with the plurality of combinations, to obtain updated probability values; and
   updating the machine learning model using (i) a second set of degraded images for each of the plurality of combinations, and (ii) the corresponding reference images, wherein a number of degraded images in the second set corresponding to the particular combination is selected based on the updated probability value associated with the particular combination.

10. The system of claim 9, wherein the plurality of combinations of degradations comprise at least one of: noise, blur, or resolution downscaling.

11. The system of claim 9, wherein the probability values are initialized as equal to each other.

12. The system of claim 9, wherein the validation process comprises:
obtaining a second plurality of reference images; and
applying the plurality of combinations of degradations on multiple subsets of the second plurality of reference images to generate validation images corresponding to each of the plurality of combinations.

13. The system of claim 12, wherein the validation process further comprises generating enhanced images from the validation images using the updated machine learning model.

14. The system of claim 9, wherein determining the loss value comprises at least one of: calculating a pixel loss value, a high-frequency loss value, a total loss value, or a match error.

15. The system of claim 14, wherein determining the loss value for a particular combination comprises determining one or more metrics of similarity between (i) validation images for the particular combination and (ii) enhanced images.

16. One or more non-transitory machine-readable storage devices encoded with instructions configured to cause one or more processing devices to execute operations comprising:
obtaining a plurality of reference images;
applying a plurality of combinations of degradations on the reference images to generate degraded images corresponding to each of the plurality of combinations;
training a machine learning model using (i) a first set of degraded images for each of the plurality of combinations, and (ii) the corresponding reference images, wherein a number of degraded images in the first set corresponding to a particular combination of the plurality of combinations is selected in accordance with a probability value associated with the particular combination;
determining, using a validation process for the machine learning model, a loss value for each of the plurality of combinations of degradations;
calculating, based on the loss values, updates to the probability values associated with the plurality of combinations, to obtain updated probability values; and
updating the machine learning model using (i) a second set of degraded images for each of the plurality of combinations, and (ii) the corresponding reference images, wherein a number of degraded images in the second set corresponding to the particular combination is selected based on the updated probability value associated with the particular combination.

17. The one or more non-transitory machine-readable storage devices of claim 16, wherein the plurality of combinations of degradations comprise at least one of: noise, blur, or resolution downscaling.

18. The one or more non-transitory machine-readable storage devices of claim 16, wherein the validation process comprises:
obtaining a second plurality of reference images; and
applying the plurality of combinations of degradations on multiple subsets of the second plurality of reference images to generate validation images corresponding to each of the plurality of combinations.

19. The one or more non-transitory machine-readable storage devices of claim 18, wherein determining the loss value for a particular combination comprises determining one or more metrics of similarity between (i) validation images for the particular combination and (ii) the enhanced images.

20. The one or more non-transitory machine-readable storage devices of claim 19, wherein calculating updates to the probability values comprises:
determining, that the loss value for a first particular combination is higher than the loss value for a second particular combination; and
responsive to determining that the loss value for the first particular combination is higher than the loss value for the second particular combination, assigning a first probability value to the first particular combination, the first probability value being higher than a second probability value assigned to the second particular combination.

* * * * *